United States Patent [19]

Corcoran

[11] Patent Number: 5,386,643
[45] Date of Patent: Feb. 7, 1995

[54] DIGITAL DISPLAY TAPE MEASURE

[76] Inventor: Bradley H. Corcoran, 6580 Lakeview, Apartment 14107, Westland, Mich. 48185

[21] Appl. No.: 52,482

[22] Filed: Apr. 23, 1993

[51] Int. Cl.⁶ .............................................. G01B 3/10
[52] U.S. Cl. .......................... 33/762; 33/767; 33/769; 242/396.9; 242/394.1; 242/564.2
[58] Field of Search ................. 33/762, 763, 767, 769; 242/396.9, 396.7, 394.1, 564.2

[56] References Cited

U.S. PATENT DOCUMENTS

| | | | |
|---|---|---|---|
| 2,079,908 | 5/1937 | House | 33/767 |
| 2,106,053 | 1/1938 | Laingor | 33/767 |
| 2,553,613 | 5/1951 | True | 33/762 |
| 2,854,753 | 10/1958 | Caparros | 33/762 |
| 3,114,515 | 12/1963 | Kane | 33/767 |
| 4,178,691 | 12/1979 | Tateishi | 33/762 |
| 4,186,490 | 2/1980 | Quenot | 33/762 |
| 4,242,574 | 12/1980 | Grant . | |
| 4,535,415 | 8/1985 | Hird | 33/763 |
| 4,551,847 | 11/1985 | Caldwell . | |
| 4,575,944 | 3/1986 | Lin | 33/762 |
| 4,747,215 | 5/1988 | Waikas . | |
| 4,765,557 | 8/1988 | Kahmann | 33/767 |
| 4,856,726 | 8/1989 | Kang | 33/767 |
| 4,890,392 | 1/1990 | Komura et al. . | |
| 5,027,526 | 7/1991 | Crane . | |
| 5,044,089 | 9/1991 | Petkovic et al. . | |
| 5,060,394 | 10/1991 | Lincoln et al. . | |
| 5,142,793 | 9/1992 | Crane . | |

FOREIGN PATENT DOCUMENTS

| | | | |
|---|---|---|---|
| 2829247 | 1/1980 | Germany | 33/763 |
| 2017929 | 10/1979 | United Kingdom | 33/762 |
| 2241060A | 8/1991 | United Kingdom . | |

*Primary Examiner*—Thomas B. Will
*Attorney, Agent, or Firm*—Harness, Dickey & Pierce

[57] ABSTRACT

This invention discloses a digital display tape measure having an accuracy of about 0.01 mm. The digital display tape measure includes a metal tape having a series of uniformly sized and spaced holes positioned along a common center line of the tape. As the tape is extracted and retracted from the tape measure housing, the holes engage pins positioned on a sprocket such that the sprocket will rotate causing an optical encoder to rotate along the same axis. The optical encoder produces optical pulses to provide the desired accuracy. The tape measure further includes a braking mechanism, an indexing mechanism and a drive motor. The braking mechanism prevents the reel on which the tape is wound from rotating in its normal mode. A braking arm and motor switch are configured relative to each other such that the braking arm has to deactivate the braking mechanism prior to the motor switch activating the drive motor. The indexing arm enables the reel to be incremented when the braking mechanism is activated.

24 Claims, 4 Drawing Sheets

5,386,643

DIGITAL DISPLAY TAPE MEASURE

BACKGROUND OF THE INVENTION

1. Field of the Invention

This invention relates generally to an electronic tape measure incorporating a digital readout and, more particularly, to an electronic digital display tape measure incorporating an optical encoder for providing a measurement of distance having an accuracy of about 0.01 mm.

2. Discussion of the Related Art

Compact and lightweight tape measures having a metal measuring tape which is secured and wound around a reel within a housing in a spring loaded fashion are known in the art. The conventional tape measure of this type enables a worker to manually extract the tape from the housing against the bias of the spring to a length such that a measurement can be made on a particular workpiece or the like by visually aligning measuring indicia on the tape with a desirable location on the workpiece. Once a measurement has been taken, the tape can be automatically wound back on the reel within the housing by the spring. Clearly, these conventional tape measures are limited in accuracy in the ability to precisely locate the marking indicia, as well as the ability of the worker in visually aligning the indicia with the desirable location on the workpiece.

In order to, at least in one respect, provide heightened accuracy over the conventional tape measure, it is also known in the art to include certain mechanisms associated with the tape measure for automatically determining the length of the tape as it is extracted from the housing, and also to provide a readable indication of this length. A worker need only line up the length of the tape extracted with the distance to be measured to make a measurement.

A number of mechanisms are known in the art for determining the length of the tape as it is being extracted from the housing. In many cases, these mechanisms include circuitry for producing pulses which are converted into a linear measurement. Different pulse producing circuits include providing conductive brushes in contact with a conductively encoded disk rotatable as the tape moves, providing optical sensors, in one form or another, for measuring rotation of a disk as the disk is rotated when the tape moves, and providing a magnetic strip along the tape which is read by a magnetic strip reader as the tape is extracted or retracted into the housing.

In one particular application, U.S. Pat. No. 4,551,847 issued to Caldwell discloses a digital tape measuring device in which a measuring tape includes a series of spaced holes. As the tape is wound or unwound from a spring loaded reel, the holes engage a rotatable pinned sprocket. As the sprocket rotates with the movement of the tape, an encoded disk rotates with the sprocket. Optical sensors are mounted relative to the encoded disk which are optically responsive to indicia strategically positioned on the disk. As the disk rotates, the optical sensors provide a linear displacement of the tape with an accuracy of 1/32 of an inch.

Although the prior art digital tape measuring devices offer improvements over the conventional manual tape measuring devices, the accuracy with which these tape measures can measure a distance can be improved. It is therefore an object of the present invention to provide a digital tape measuring device which includes components for providing a higher degree of measuring accuracy heretofore not found in the prior art.

SUMMARY OF THE INVENTION

The present invention discloses a digital tape measuring device including a tape wound around a reel within a housing in which the tape includes a series of spaced holes along a common center line. A pinned sprocket is positioned within the housing such that as the tape is wound onto or unwound from the reel, the holes in the tape engage pins protruding from the sprocket. As the tape engages the pinned sprocket, it is rotated on a shaft. Additionally, a rotary optical encoder transducer is also rotated on the shaft along with the pinned sprocket. In one embodiment, the optical transducer is capable of producing 2500 pulses each time the sprocket rotates one full revolution. These pulses are converted to a 10,000 count quadrature output to provide an accuracy of 0.01 mm.

In a preferred embodiment, a driving motor is attached to the shaft on which the sprocket and optical encoder rotate in order to cause the tape to be extracted. Further, the tape measuring device includes a braking mechanism which resists rotation of the reel sprocket in its normal mode so as to prevent the tape from moving. A braking lever associated with the braking mechanism and a motor switch associated with the driving motor are so configured such that the braking lever must first disengage the braking mechanism before the motor switch can activate the driving motor. Additionally, an indexing mechanism is incorporated which, when activated, will incrementally cause the tape to either be extracted or retracted. The indexing mechanism is operable to increment the tape when the braking mechanism is engaged.

Additional objects, advantages, and features of the present invention will become apparent from the following description and appended claims, taken in conjunction with accompanying drawings.

DETAILED DESCRIPTION OF THE PREFERRED EMBODIMENTS

The following discussion of the preferred embodiments concerning a digital display tape measure is merely exemplary in nature and is in no way intended to limit the invention or its applications or uses.

Figure 1:
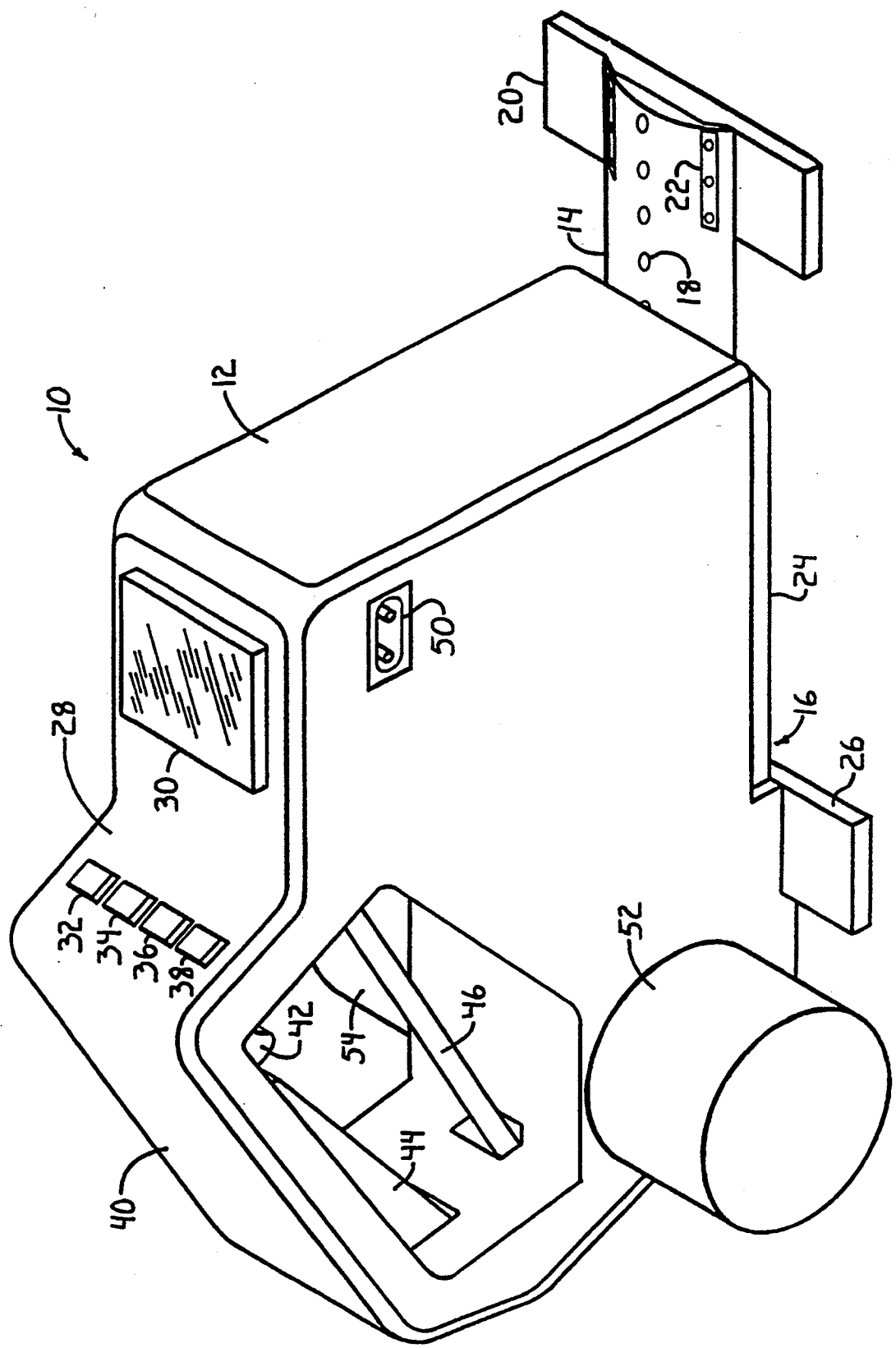
FIG. 1 is a perspective view of a digital display tape measure according to one preferred embodiment of the present invention.

First turning to FIG. 1, a perspective view of a digital display tape measure 10, according to one preferred embodiment of the present invention, is shown. The tape measure 10 comprises a specially shaped housing 12 from which a metal tape 14, coiled on a reel (see FIG. 2), is extendable through an opening 16 in a bottom surface of the housing 12. The size of the housing 12 may vary, and is largely dependent on the length of the tape 14. However, it should be noted that the dimensions of the housing 12 do provide for a convenient hand-holdable tape measure device. As will be discussed in detail below, the tape measure 10 includes a number of mechanical and electrical components which enable the tape 14 to be extracted and retracted through the opening 16 in the housing 12, while at the same time automatically displaying an accurate measurement of a workpiece (not shown) based upon the length of the tape 14 which is extended.

The tape 14 includes a series of holes 18 positioned at regular intervals along a center line of the tape 14. In one preferred embodiment, the holes are approximately 3 mm in diameter and are spaced approximately 1 cm apart. As is apparent, and for reasons which will become apparent from the discussion below, the tape 14 is curved such that its edges extend downwards. At an end of the tape 14 extending from the housing 12 is a tape squaring member 20 which is preferably secured to a bottom surface of the tape 14 by means of a set of appropriate connectors 22 such as rivets. The member 20 enables the tape 14 to be hooked to an edge of the workpiece to be measured in a manner well understood to those skilled in the art. The member 20 may be attached to the tape 14 in a manner so as to enable the member 20 to be readily removed and the tape 14 cut down in the event that the end of the tape 14 becomes damaged. Further, measuring indicia can be patterned on the tape 14 to provide a visual measuring indication in a manner conventional in the art.

Attached to the bottom surface of the housing 12, and further defining the opening 16, is a tape guide 24 including a tape stop 26. The guide 24 defines a measuring contact area and has a function of guiding the tape 14 as it is being extracted and retracted into the housing 12. When the tape 14 is fully retracted, the member 20 will abut against the stop 26, and thus, provide a reference location for zeroing out the measurement. When measuring, the stop 26 is aligned with a first position of the workpiece to be measured and the member 20 is positioned at a second position of the workpiece. In this regard, the guide 24 acts as a contact area on the workpiece as well as providing a squaring function.

A top surface 28 of the housing 12 accommodates a digital readout device 30, which may be a liquid crystal display (LCD) or a light emitting diode (LED) display for providing a visible digital indication of a particular measurement. Display devices of this type are well known in the art. Specifically, the display device 30 can be a SUB-CUB-D 8 digit component counter with a 6-digit LCD display and a quadrature interface (see FIG. 2) as described in U.S. Pat. No. 4,599,600, and being commercially available from Red Lion Controls, herein incorporated by reference. Additionally, the surface 28 accommodates a series of pushbutton switches including an on/off pushbutton switch 32 and a zeroing pushbutton switch 34. The zeroing pushbutton switch 34 provides a means by which the display device 30 can be zeroed out when the member 20 is in contact with the stop 26, or at any desirable time, in a manner as will be discussed in greater detail below. Also provided is a Metric/English pushbutton switch 36 for converting the display device 30 back and forth between Metric and English readings. Further, a hold pushbutton switch 38 is provided to maintain a visual record of the display reading after the tape 14 has been retracted.

As is apparent, the tape measure 10 includes a grip portion 40 for providing ease of grasping the tape measure 10. Positioned within an opening defined by the grip portion 40 is a motor trigger 42, a braking arm 44 and an indexing arm 46. The motor trigger switch 42 activates a drive motor (discussed below) for extracting the tape 14. The braking arm 44 is part of a braking mechanism which prevents recoil of the tape 14. The indexing arm 46 is part of an indexing mechanism which causes the tape 14 to be extracted from or retracted into the housing 12 an incremental distance. The braking mechanism, indexing mechanism and drive motor will be discussed in greater detail with respect to FIGS. 2 and 3 below.

An AC adaptor outlet 50 is provided to recharge a battery pack (see FIG. 2) positioned within the housing 12 by an AC outlet through an associated cord as is well understood in the art. Also provided external to the housing 12 is an optical encoder 52 and a drive motor 54 whose operations will be discussed in greater detail below. It is noted that other positions of the above discussed components, as well as the addition of other tape measure related features, of the digital display tape measure 10 can be provided without departing from the spirit and scope of the invention.

Figure 2:
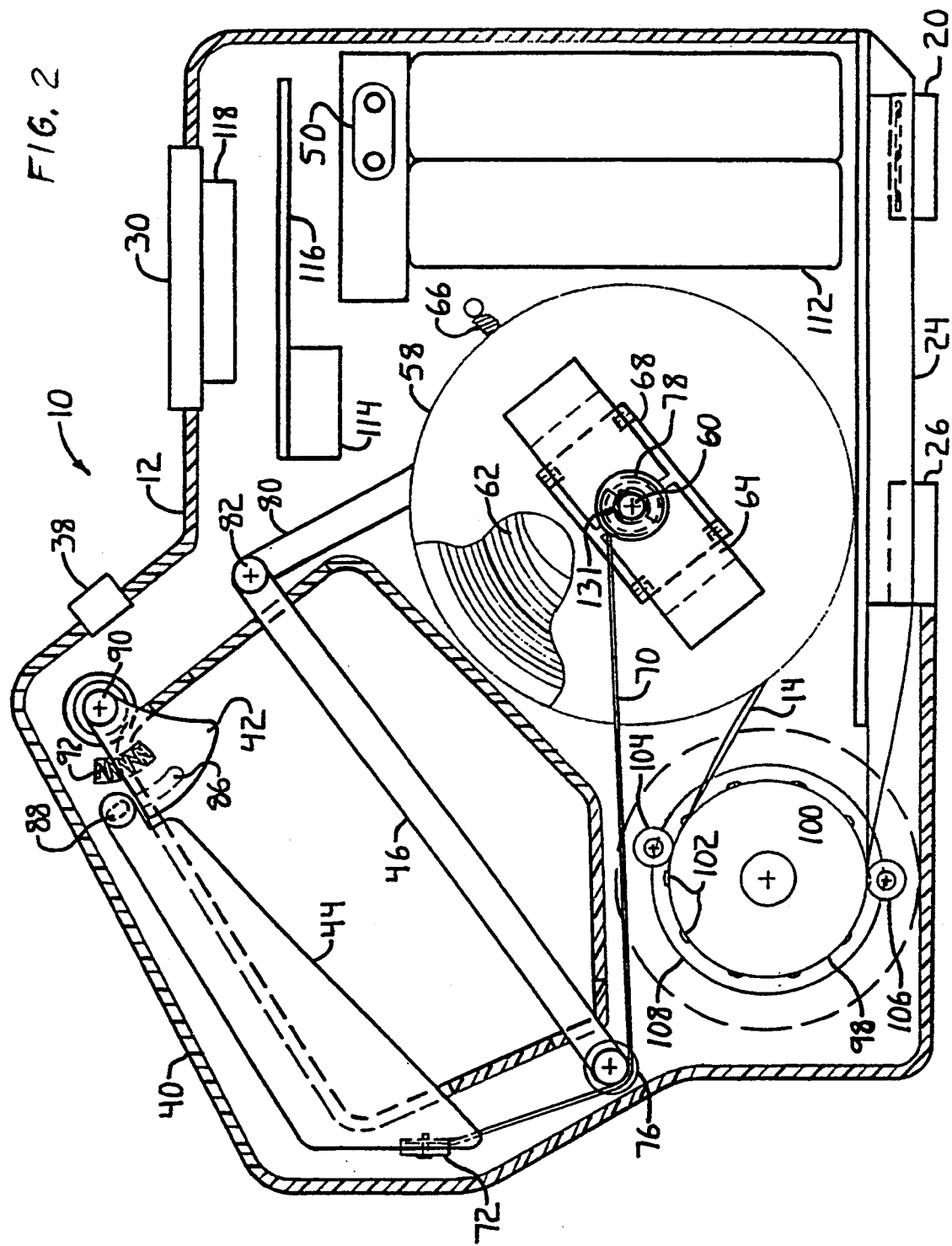
FIG. 2 is a cutaway, side view of the digital display tape measure of FIG. 1.

Now turning to FIG. 2, a cutaway side view of the digital display tape measure 10 of FIG. 1 is shown. As is apparent, the tape 14 is wound on a tape supply reel 58 in a counterclockwise direction. The supply reel 58 is rotatably mounted on a center arbor 60 extending between the sidewalls of the housing 12. In a preferred embodiment, a sleeve (see FIG. 3) is rotatably positioned on the arbor 60, and the reel 58 is rotatable on the sleeve. A bias spring 66 holds the reel 58 at a desirable location on the arbor 60 when the braking mechanism is engaged. An end of the tape 14, opposite to the member 20, is attached to a spring return mechanism 62 which is also wound on and rigidly secured to the sleeve. As the tape 14 is unwound from the reel 58, the spring mechanism 62 will become more tightly wound on the sleeve, and thus become increasingly biased such that it will tend to rewind the tape 14 back onto the reel 58. This type of spring loaded arrangement for a tape measure is conventional, and thus, need not be discussed in any significant detail here.

Positioned relative to the reel 58 as part of the braking mechanism is a brake pad arm 64. The brake pad arm 64 is connected to and rotatable on the sleeve on the arbor 60 in conjunction with the reel 58. Also shown is a brake plate 68 included for reasons which will become apparent from the discussion below with reference to FIG. 3. A braking cable 70 is shown connected to an end of the braking arm 44, opposite to the trigger switch 42. A clasping mechanism 72 connects the cable 70 to the braking arm 44, and enables the length of the braking cable 70 to be adjusted. The braking cable 70 extends from the braking arm 44 around a first pulley 76 and is connected to a second pulley 78. The first pulley 76 is symmetrically positioned at a pivot location of the indexing arm 46. The second pulley 78 is symmetrically mounted on the arbor 60. When the braking arm 44 is compressed, the braking cable 70 is pulled away from the reel 58. This movement causes the pulley 78 to rotate, which, as will be discussed in greater detail with respect to FIG. 3 below, causes the braking arm 64 to disengage the reel 58 so that the tape 14 can be recoiled with the bias provided by the spring mechanism 62.

Since the braking mechanism is engaged in its normal mode, it is imperative that the brake pad arm 64 be released upon activation of the drive motor 54 to prevent the drive motor 54 from rotating the reel 58 when the braking mechanism is engaged and causing damage. Therefore, the braking arm 44 must be compressed prior to the trigger switch 42 activating the drive motor 54. In order to provide this safety feature, a slot and tab configuration is included. Specifically, a slot 86 is associated with the trigger switch 42 and a tab 88 is associated with the braking arm 44 as shown. The tab 88 is so positioned relative to the switch 42 so that if the braking arm 44 is not compressed, the tab 88 will contact an edge of the trigger switch 42 if the trigger switch 42 is activated, thus preventing actuation of the drive motor 54. However, if the braking arm 44 is compressed, the tab 88 will geometrically align with the slot 86 such that the trigger switch 42 is free to pivot at a pivot location 90. A spring mechanism 92 is provided to return the trigger switch 42 to its original location once the drive motor 54 is disengaged.

The indexing arm 46 is actuatable at the pivot location defined by the first pulley 76 in either an up or down motion. The up or down motion of the arm 46 causes a second indexing arm 80 to be moved back and forth at a pivot location 82 where the indexing arms 46 and 80 are connected. The opposite end of the second indexing arm 80 is connected to an opposite side of the reel 58 from the brake pad arm 64 as will be shown more clearly with reference to FIG. 3. As the second indexing arm 80 is moved the entire reel 58 and braking mechanism positioned on the sleeve is rotated relative to the arbor 60 against the force of the bias spring 66. Consequently, the tape 14 can be extracted or retracted a minimal distance when the brake pad arm 64 is engaging the reel 58. The bias spring 66 returns the reel 58 to its original location.

Positioned within the housing 12 between the optical encoder 52 and the drive motor 54 is a pinned sprocket 98 rotatable on a shaft 100. The shaft 100 is common to all three of the encoder 52, the motor 54 and the sprocket 98. The pinned sprocket 98 includes a series of strategically positioned pins 102 circumferentially placed along a common center line of the pinned sprocket 98. In a preferred embodiment, there are ten (10) of the pins 102 positioned every 36°. For this number of pins, the circumference of the sprocket 98 will be approximately 10 cm in order to align with the holes 18 in the tape 14. The proper alignment of the pins 102 and the holes 18 is crucial to the operation of the device. The tape 14 is partially wound around the sprocket 98 such that at least five of the pins 102 are constantly positioned within the holes 18 which enables approximately 190° of the sprocket 98 to contact the tape 14. As the tape 14 is extracted or retracted into the housing 12, the holes 18 in the tape 14 engage the pins 102, thus rotating the sprocket 98 on the shaft 100. Rotation of the pinned sprocket 98 will ultimately provide the mechanism for determining the linear displacement of the tape 14, as will be discussed in detail below. Positioned relative to the pinned sprocket 98 are a set of idler wheels 104 and 106 which maintain the tape 14 on the pinned sprocket 98. Additionally, the pinned sprocket 98 includes sidewalls 108 which also help maintain the tape 14 on the sprocket 98.

The optical encoder 52 is a device that upon rotation of the shaft 100 will produce a number of pulses which can be electrically processed to provide a linear indication of distance. In particular, as the shaft 100 rotates, a disk (not shown), associated with the encoder 52 and including a series of radial lines, will rotate at the same rate. A first optical sensor (not shown) associated with the encoder 52 will sense the radial lines and produce pulses with respect to these lines. A second optical sensor (not shown) will sense in what direction the disk is rotating. Therefore, as the disk rotates relative to the optical sensors, a series of pulses is produced depending on the speed of rotation of the disk. A first and second channel output from the sensors are generated 90° out of phase. These channels develop a square wave quadrature output having four square waves per each pulse. In a preferred embodiment, the optical encoder 52 has a 2500 line count so as to produce 10,000 pulses each time the pinned sprocket 68 rotates one full revolution. A commercially available optical encoder which operates in this fashion is the E-202-2500-31 incremental rotary optical encoder available from BEI Motion Systems Company.

When not in use, the motor 54 is switched to a dead short across the poles of the motor 54. This dead short condition provides tape recoil speed control in that as motor speed increases, the electrical current that the motor 54 produces increases, and the resulting magnetic pull slows the motor arbor or shaft 100. This dead short is effective to prevent damage to the tape 14, or the sprocket 98. The dead short condition requires a resistor (not shown) electrically connected in series between the motor poles to control current rate. The applicable resistor is dependant on the size of the motor and the preferred slowing rate, both of which are unknown.

Also shown in FIG. 2, is a battery pack 112 in electrical connection with the AC adaptor outlet 50, a microprocessor 114, a patching board 116 and a quadrature interface 118. The patching board 116 provides electrical connections (not shown in this figure) between each of these electrical components. The electrical connection between the electrical components of the tape measure 10 will be discussed in more detail with reference to FIG. 4 below. The battery pack 112 may consist of rechargeable nickel-cadmium batteries for producing the desired output voltage.

Figure 3:
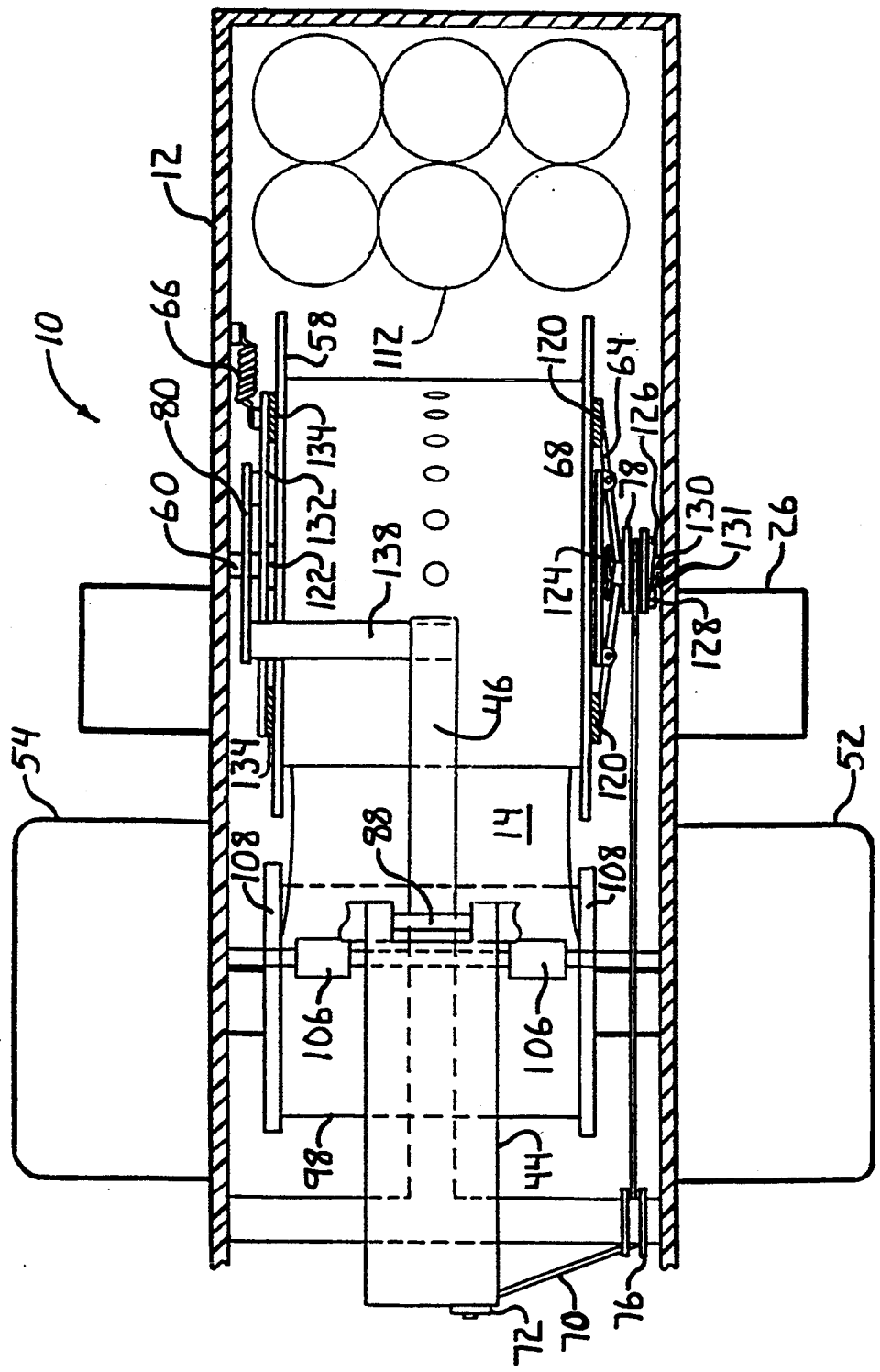
FIG. 3 is a cut-away top of the tape measure of FIG. 1.

Turning to FIG. 3, shown is a cut-away top view of the tape measure 10. The braking mechanism is shown consisting of the braking arm 44, the braking cable 70, the pad arm 64, and the pulleys 76 and 78. Associated with the pad arm 64 is a set of brake pads 120 connected to the ends of the pad arm 64 as shown. The brake pads 120 contact the reel 58 in the normal mode to prevent its rotation. The brake plate 68 is positioned on a sleeve 122 on the arbor 60 adjacent to the reel 58 and connected to the pad arm 64. A bias spring 124 is symmetrically positioned on the sleeve 122 between the pad arm 64 and the brake plate 68. The second pulley 78 is positioned adjacent the pad arm 64 opposite to the bias spring 124, and is axially slidable on the arbor 60. Included in association with the second pulley 78, opposite to the brake pad arm 64, is a first wedge 126 and a second wedge 128. The first wedge 126 is attached to one half of one side of the pulley 78 and the second wedge 128 is attached to the opposite half of the same side of the pulley 128. Adjacent to the first and second wedges 126 and 128 is a set of pins rigidly secured to the housing 12. Only one of the pins, pin 130, is shown. A recoil spring 131 is provided in order to cause the pulley 78 to return to its original location after the braking arm 44 has been compressed. The recoil spring 131 is connected to the pin 130, coils around the arbor 60 and is connected to the pulley 78.

Positioned opposite to the reel 58 from the pad arm 64 is a second pad arm 132 including a second set of pads 134. The pressure exerted by the pad arm 64 against the second pad arm 132 prevents the reel 58 from rotating. The second indexing arm 80 is connected to the second pad arm 132. Also shown is an extension arm 138 which connects the indexing arm 46 to the indexing arm 80. As mentioned above, moving the indexing arm 46 causes the reel 58 to be incremented. The spring 66 is connected to the second pad arm 132.

When the brake cable 70 is drawn away from the reel 58, the pulley 78 rotates against the bias of the recoil spring 131 which causes the first and second wedges 126 and 128 to rotate in association with the pulley 78. As the wedges 126 and 128 rotate, they engage the pins 130 with increasing force as the fatter portions of the wedges 126 and 128 become aligned with the pins 130. This causes the pulley 78 to slide axially towards the reel 58. This motion in turn results in the bias spring 124 applying pressure against the pad arm 64 and the plate 68. This makes the pad arm 64 flex, and thus cause the brake pads 120 to pivot away from the reel 58 so the reel 58 is free to rotate on the sleeve 122.

In order to ensure that the pins 102 will align with the holes 18 on the tape 14, during assembly of the tape measure 10 the holes 18 are first precision cut by appropriate machinery, well known to those skilled in the art, having the level of accuracy necessary to produce highly uniformly spaced and sized holes. The pins 102 on the pinned sprocket 98 are then provided and aligned with the holes 18. The tape 14 is curved downward in order to more readily enable the holes 18 to engage the pins 102, to enable the tape 14 to more readily contact the workpiece being measured, and to maintain the tape 14 level, rigid and straight. Although a conventional sized metal tape will work in a desirable manner, a tape which provides more rigidity may offer a more desirable configuration.

In operation, a worker desiring to take a measurement of a workpiece, will first completely retract the tape 14 and zero out the digital display device 30 by pressing the zeroing button 32. Next, after disengaging the braking mechanism, the worker will extract the tape 14 from the housing 12, either by the motor drive unit 54 or by manual operation. As the tape 14 is being extracted, the pinned sprocket 98 will be rotating, which will in turn cause the optical encoder 52 to count pulses indicative of this rotation. As the optical encoder 52 counts pulses, the digital display device 30 will provide a linear interpretation of these pulses. The worker then will align the end associated with the member 20 of the tape 14 at one position on the workpiece and the stop 26 at another position of the workpiece, and read the digital display device 30 to provide an indication of this distance. Additionally, by zeroing out the display device 30 at desirable times, it is possible to make other measurements.

Figure 4:
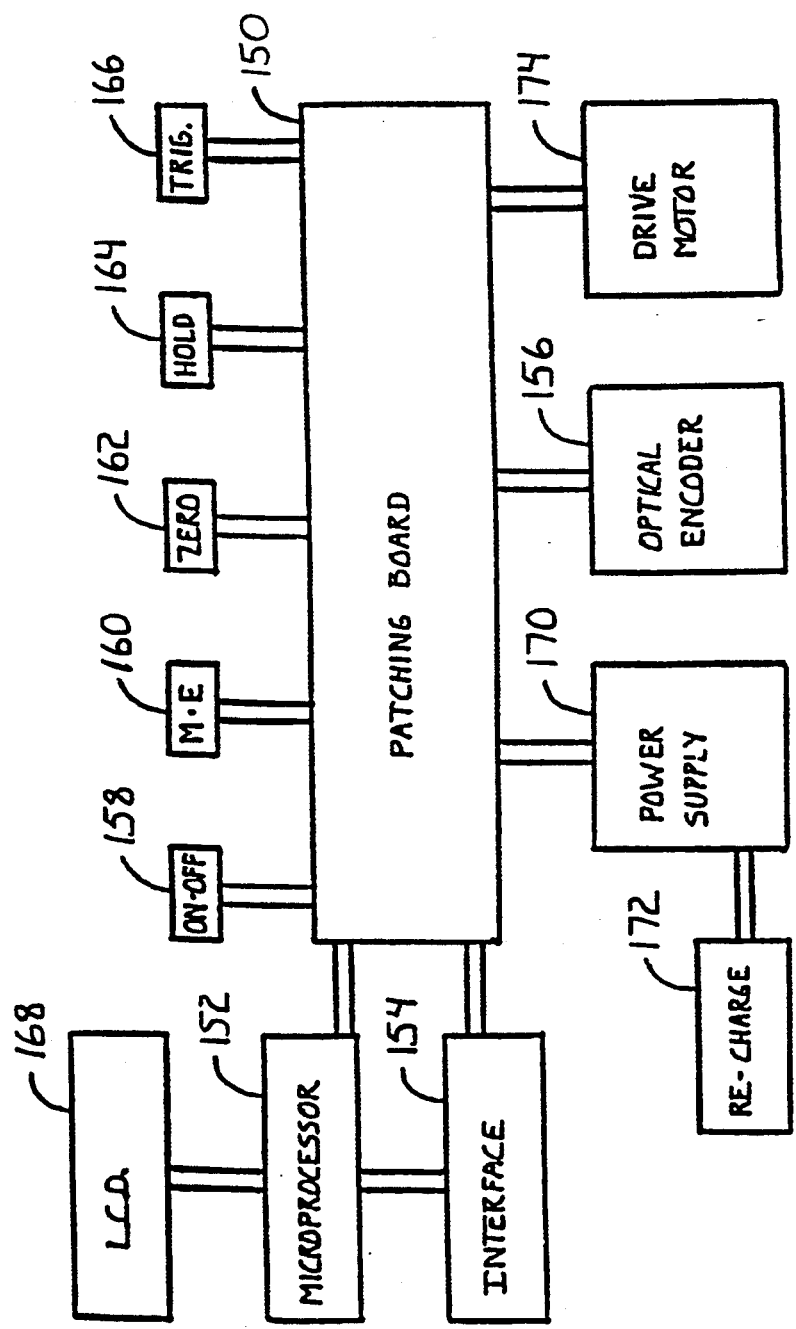
FIG. 4 is a block diagram schematic of the circuitry controlling the digital display tape measure of FIG. 1 according to one preferred embodiment of the present invention.

FIG. 4 shows a schematic block diagram of the connection of the electrical components associated with the digital display tape measure 10 as discussed above according to a preferred embodiment. A patching board 150 provides a desirable electrical connection between the components. A microprocessor 152 controls the operation of the tape measure 10, specifically receiving data information from an interface 154 and providing a mathematical conversion to and from metric and English units of measure. The interface 154 receives a square wave quadrature output from an optical encoder 156 and applies an appropriate signal to an LCD readout 168. Also represented are each of the pushbuttons, specifically an on/off button 158, a Metric to English conversion pushbutton 160, a zeroing pushbutton 162, and a hold button 164, and a motor trigger 166. Also, a power supply 170 is connected to the patching board 150 along with a recharging unit 172. And, a drive motor 174 is appropriately connected. These components are represented to show the electrical connection of the components discussed above. Each component would be readily available for the application as discussed above to one of ordinary skill in the art.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A digital display tape measure comprising:
   a housing;
   a tape wound on a real within the housing, said tape including a series of substantially equally spaced and equally dimensioned holes along a common line;
   a sprocket rotatable on a shaft positioned within the housing, the rotatable sprocket including a series of strategically positioned pins such that when the tape is extracted or retracted from the housing, the pins engage the holes in the tape and cause the sprocket to rotate;
   means for providing a signal indicative of the rotation of the pinned sprocket;
   a display device operable to receive the signal from the means for providing a signal and converting the signal to a linear digital readout; and
   an indexing arm, said indexing arm activating an indexing mechanism that causes the reel on which the tape is wound to be incremented.

2. The digital display tape measure according to claim 1 wherein the means for providing a signal is an optical encoder rotatable on the shaft, said optical encoder providing a pulse count signal indicative of the rotation of the pinned sprocket.

3. The digital display tape measure according to claim 2 wherein the optical encoder produces approximately 2500 pulse counts per single revolution of the sprocket and provides a quadrature output.

4. The digital display tape measure according to claim 1 wherein the display device is an LCD display and wherein the tape measure further comprises a zeroing switch for zeroing out the readout of the LCD device.

5. The digital display tape measure according to claim 1 further comprising a guide and stop, said guide guiding the tape from the sprocket and said stop providing a measurement reference point and preventing the tape from being retracted into the housing.

6. The digital display tape measure according to claim 1 wherein the edges of the tape are curved downward such that a central portion along the length of the tape contacts the sprocket.

7. The digital display tape measure according to claim 1 wherein the number of pins on the sprocket is ten and the sprocket has a circumference of approximately 10 cm.

8. The digital display tape measure according to claim 1 wherein the tape includes a tape stop connected to the tape at an end which extends from the housing.

9. The digital display tape measure according to claim 1 further comprising a motor drive unit for electrically driving the shaft on which the sprocket rotates.

10. The digital display tape measure according to claim 1 further comprising a brake means for preventing the reel from rotating, said brake means including a brake arm and brake pad wherein upon activation of the brake arm, the brake pad disengages the reel to enable it to rotate.

11. The digital display tape measure according to claim 10 further comprising a motor switch for activating a drive motor that electrically drives the shaft on which the sprocket rotates, said switch operating in association with the brake arm wherein activation of the motor switch is prevented when the brake arm is not activated.

12. The digital display tape measure according to claim 1 wherein the tape measure includes a grip section which defines an opening including a braking mechanism for actuating a braking device that prevents the reel from rotating and said indexing arm for activating said indexing mechanism.

13. The digital display tape measure according to claim 1 further comprising a braking mechanism which prevents the reel from rotating and a motor drive device that electrically drives the shaft on which the sprocket rotates upon actuation of a motor switch, wherein the braking mechanism includes a brake arm having a tab portion and the motor switch includes a slot portion such that the tab portion will engage the slot portion when both the brake arm and the motor switch are actuated, and the tab portion is prevented from engaging the slot portion when the brake arm is not actuated so as to prevent the motor switch from being actuated without actuating the brake arm.

14. The tape measure according to claim 1 wherein the tape includes a first edge portion, a second edge portion, and a middle portion, wherein the tape is curved such that the middle portion is curved towards the sprocket and the edge portions are curved away from the sprocket as the tape contacts the sprocket.

15. A tape measure comprising:
a housing;
a tape wound on a reel within the housing;
a brake means for preventing the reel from rotating, said brake means including a brake arm and brake pad wherein upon activation of the brake arm, the brake pad is released from the reel to enable the reel to rotate; and
an indexing arm, said indexing arm activating an indexing mechanism that causes the reel on which the tape is wound to be incremented.

16. The tape measure according to claim 15 wherein the brake means includes a brake cable having a first end and a second end, said first end being connected to the brake arm and the second end being connected to a pulley rotatable on a shaft on which the reel rotates, said pulley including a first wedge portion and a second wedge portion, said brake pad being rigidly attached to a pad arm that is slidably mounted on the shaft on which the reel rotates, wherein upon activation of the brake arm, the pulley rotates which causes the first and second wedge portions to contact protruding members associated with the housing so as to cause the pulley to slide axially along the shaft against a bias spring, which causes the brake pad to flex and be released from the reel.

17. The tape measure according to claim 15 further comprising a motor switch, said motor switch activating a drive motor that causes a shaft on which the reel is mounted to rotate so as to cause the tape to be extracted from the housing, said switch operating in association with the brake arm wherein activation of the motor switch is prevented when the brake arm is not activated.

18. The tape measure according to claim 17 wherein the brake arm includes a tab portion and the motor switch includes a slot portion such that the tab portion will engage the slot portion when both the brake arm and the motor switch are actuated, and the tab portion is prevented from engaging the slot portion when the brake arm is not actuated so as to prevent the motor switch from being actuated without actuating the brake arm.

19. The digital display tape measure according to claim 15, further comprising:
a sprocket rotatable on a shaft positioned within the housing, said tape includes a series of substantially equally spaced and equally dimensioned holes along a common line and being at least partially wound around the sprocket, the rotatable sprocket including a series of strategically positioned pins such that when the tape is extracted or retracted from the housing, the pins engage the holes in the tape to cause the sprocket to rotate;
an optical encoder rotatable on the shaft, said optical encoder operable to provide a pulse signal being indicative of the rotation of the pinned sprocket; and
a display device operable to receive the pulse signal from the optical encoder, said display device including a quadrature interface which converts the pulse signal to a linear digital readout having an accuracy of at least 0.01 mm.

20. The digital display tape measure according to claim 19 wherein the drive motor drives the shaft on which the sprocket and optical encoder rotate.

21. A tape measure comprising:
a housing;
a tape wound on a reel within the housing;
a brake means for preventing the reel from rotating, said brake means including a brake arm and brake pad wherein upon activation of the brake arm, the brake pad is released from the reel to enable the reel to rotate;
a motor switch for activating a drive motor that causes a shaft on which the reel is mounted to rotate so as to cause the tape to be extracted from the housing, said motor switch operating in association with the brake arm wherein activation of the motor switch is prevented when the brake arm is not activated; and an indexing arm, said indexing arm activating an indexing mechanism that causes the reel on which the tape is wound to be incremented, said indexing arm operable to increment the reel when the braking mechanism is engaged.

22. The tape measure according to claim 21 wherein the brake arm includes a tab portion and the motor switch includes a slot portion such that the motor switch is prevented from being actuated without actuating the brake arm.

23. The tape measure according to claim 21 wherein the housing defines a grip section in which the brake arm, indexing arm and motor switch are positioned within an opening defined by the grip section.

24. A tape measure comprising:
a housing;
a tape wound on a reel within the housing; and
indexing means for causing the reel on which the tape is wound to be incremented a predetermined amount each time the indexing means is activated, said indexing means enabling the reel to be indexed when the reel is prevented from being rotated by a braking device.

* * * * *